No. 630,238. Patented Aug. 1, 1899.
J. H. KESTER.
MACHINE FOR MANUFACTURING LUMP OR PLUG TOBACCO.
(Application filed Mar. 30, 1899.)
(No Model.) 6 Sheets—Sheet 3.

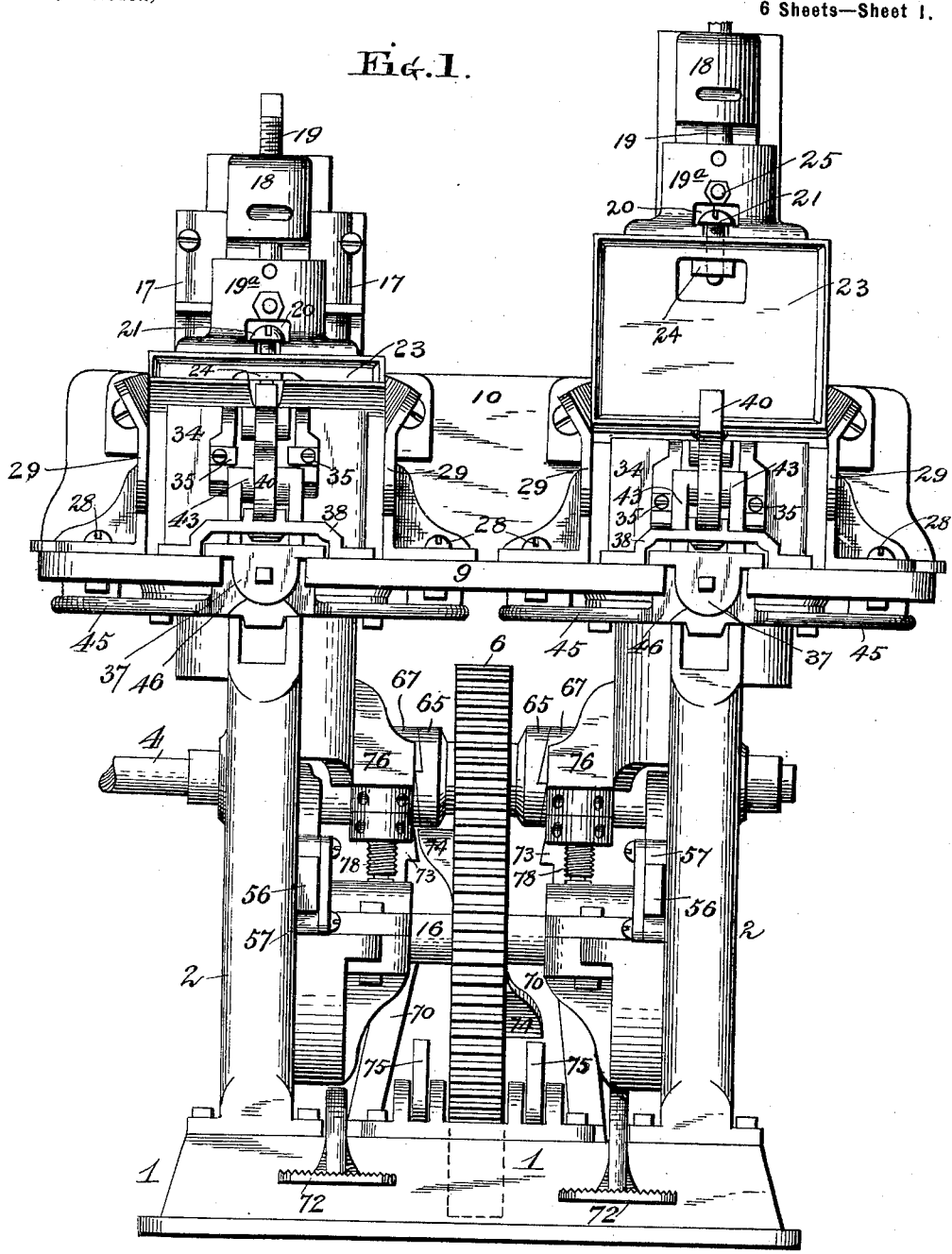

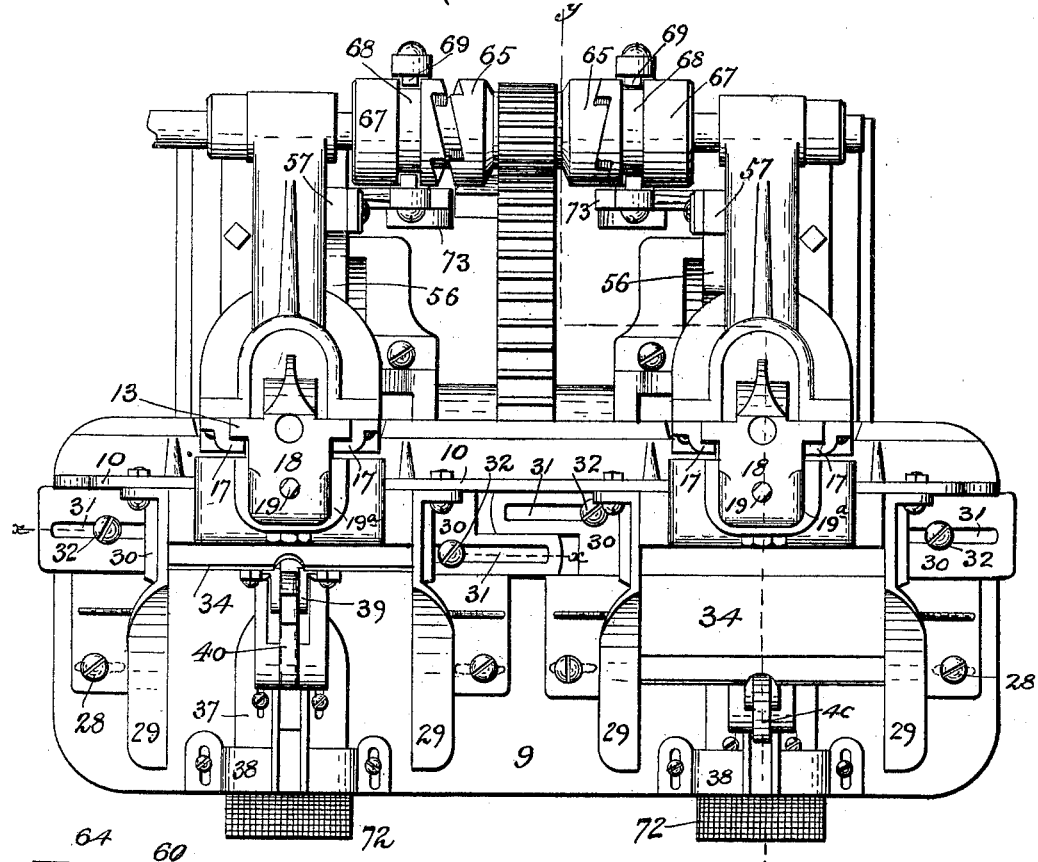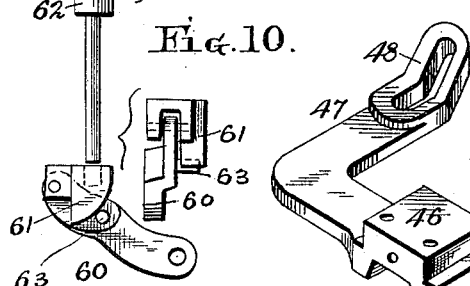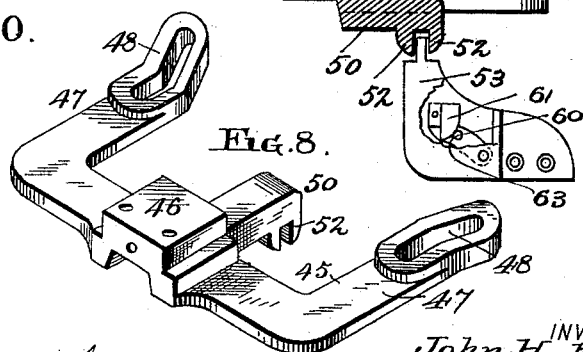

WITNESSES:
Franck L. Ourand
George J. Weber

INVENTOR
John H. Kester
BY
Louis Bagger & Co.
ATTORNEYS

No. 630,238. Patented Aug. 1, 1899.
J. H. KESTER.
MACHINE FOR MANUFACTURING LUMP OR PLUG TOBACCO.
(Application filed Mar. 30, 1899.)
(No Model.) 6 Sheets—Sheet 4.

WITNESSES:
Franck L. Ouraud
George J. Weber

INVENTOR
John H. Kester
BY
Louis Bagger & Co
ATTORNEYS

No. 630,238. Patented Aug. 1, 1899.
J. H. KESTER.
MACHINE FOR MANUFACTURING LUMP OR PLUG TOBACCO.
(Application filed Mar. 30, 1899.)

(No Model.) 6 Sheets—Sheet 5.

WITNESSES: INVENTOR
Franck L. Ouraud. John H. Kester
George J. Weber BY
Louis Bagger & Co.
ATTORNEYS

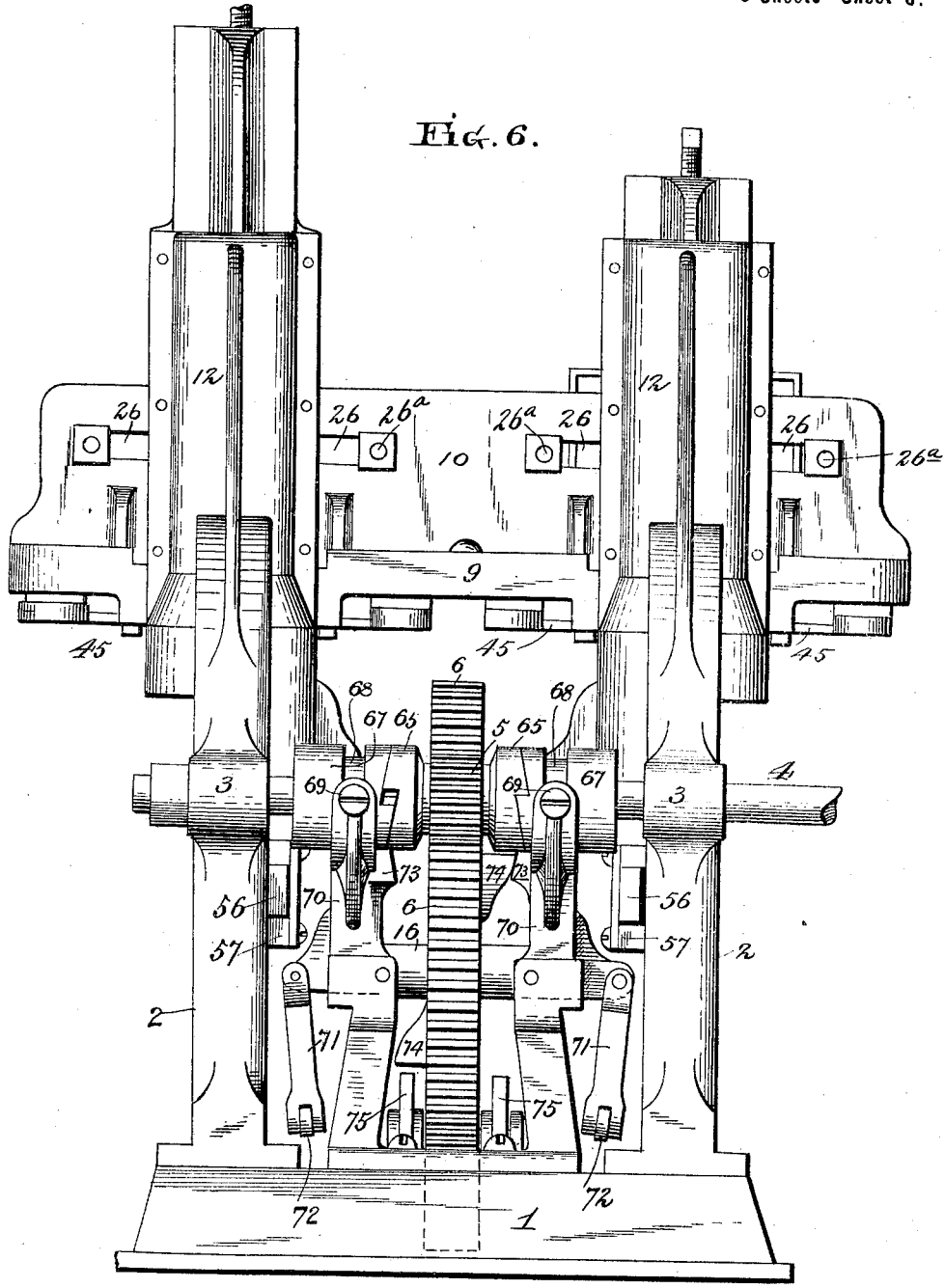

UNITED STATES PATENT OFFICE.

JOHN H. KESTER, OF WINSTON, NORTH CAROLINA.

MACHINE FOR MANUFACTURING LUMP OR PLUG TOBACCO.

SPECIFICATION forming part of Letters Patent No. 630,238, dated August 1, 1899.

Application filed March 30, 1899. Serial No. 711,154. (No model.)

*To all whom it may concern:*

Be it known that I, JOHN H. KESTER, a citizen of the United States, residing at Winston, in the county of Forsyth and State of North Carolina, have invented new and useful Improvements in Machines for Manufacturing Lump or Plug Tobacco, of which the following is a specification.

My invention relates to machines for manufacturing lump or plug tobacco of that class or description in which two stationary molds are employed provided with movable end pieces, vertically-movable plungers, and hinged fronts or aprons; and the object is to provide an improved construction of the same which shall possess superior advantages with respect to efficiency in use.

The invention consists in the novel construction and combination of parts hereinafter fully described and claimed.

Figure 3:
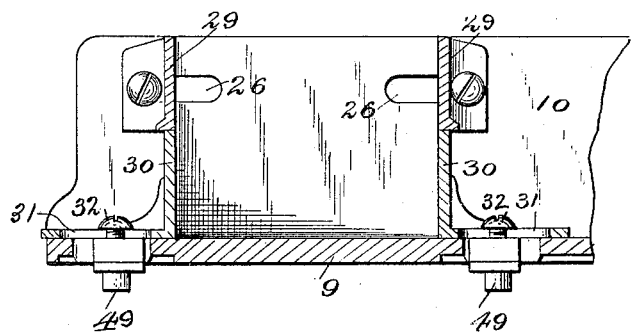
Figure 9:
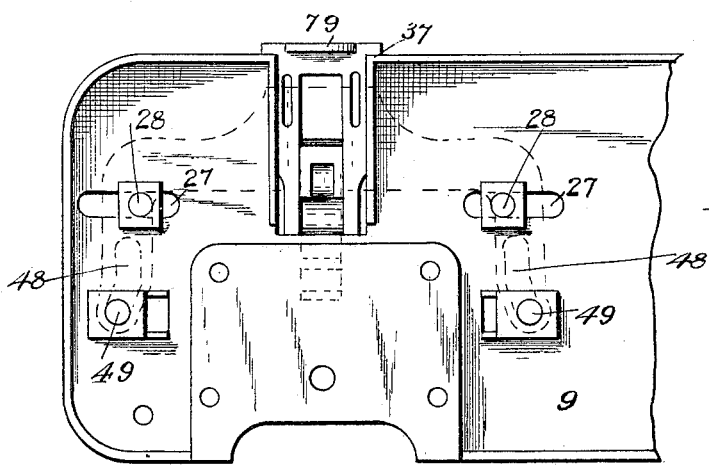
Figure 7:
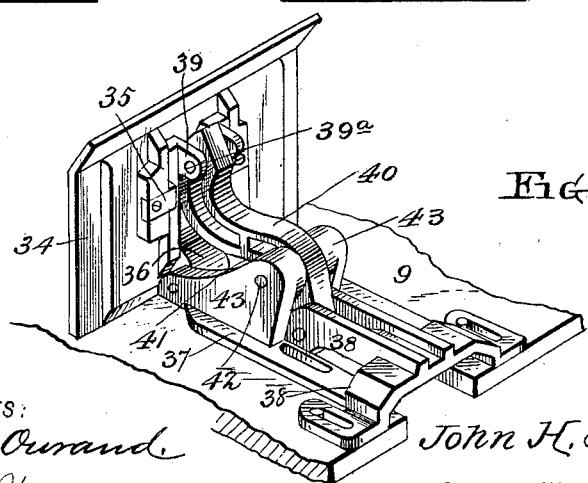
Figure 4:
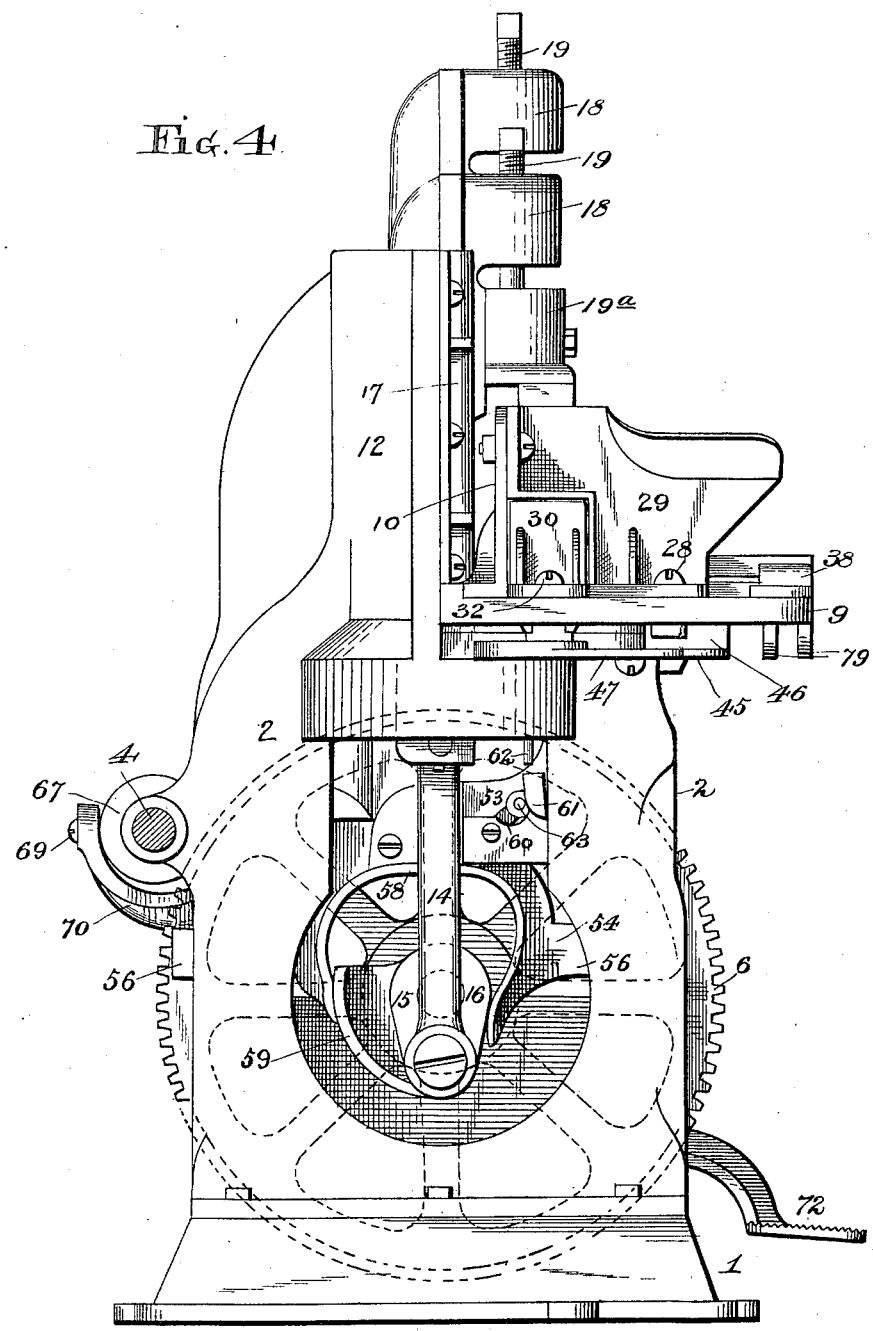
Figure 5:
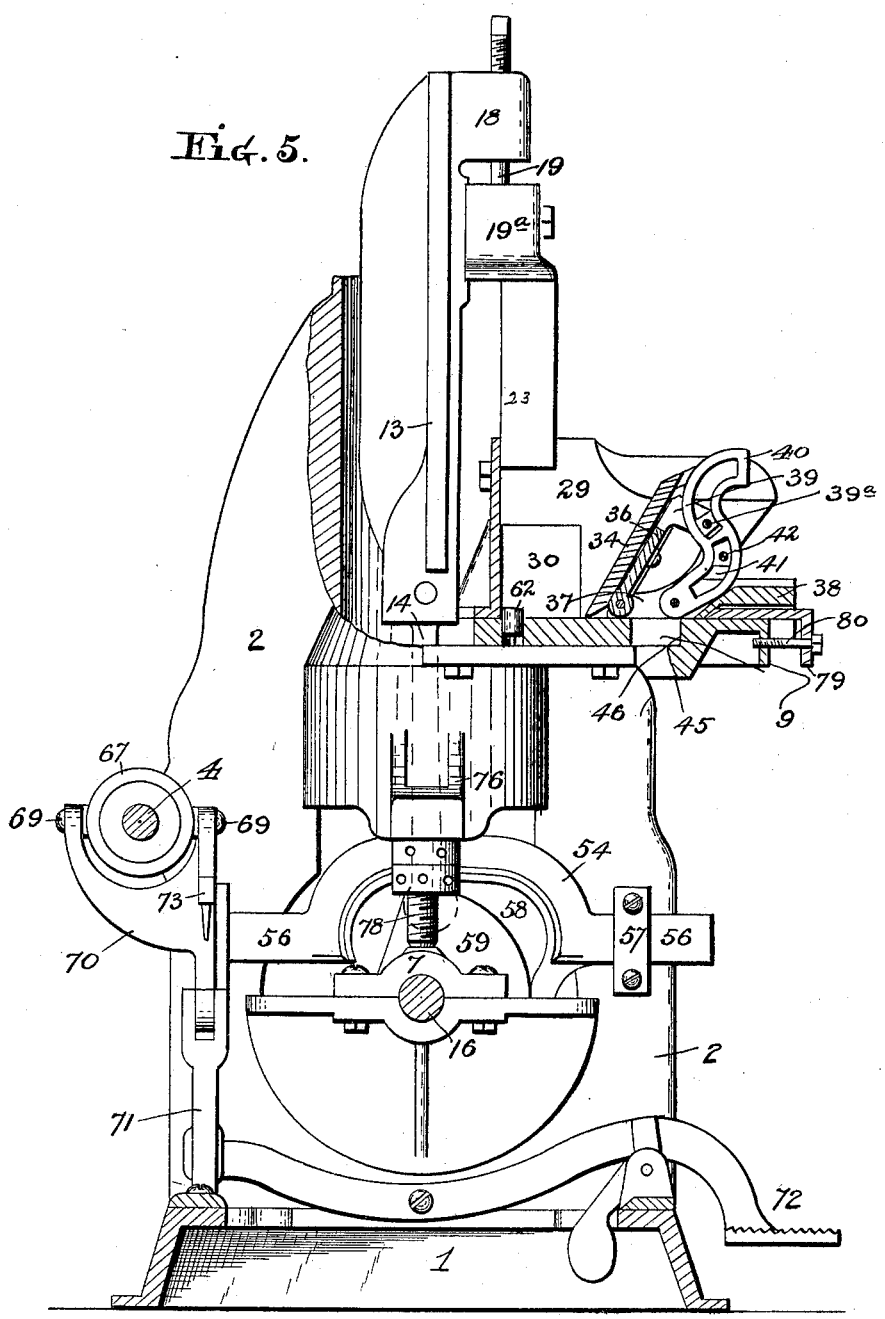

In the accompanying drawings, Figure 1 is a front elevation of a tobacco-pressing machine constructed in accordance with my invention. Fig. 2 is a plan view of the same. Fig. 3 is a longitudinal section on the line $x$ $x$, Fig. 2. Fig. 4 is an end elevation. Fig. 5 is a transverse section on the line $y$ $y$, Fig. 2. Fig. 6 is a rear elevation. Fig. 7 is a detail perspective view of the hinged front or apron of the mold, showing the plate which carries and operates the same. Fig. 8 is a detail perspective view of the horizontally-movable slide which operates the hinged front and the end plates of the molds. Fig. 9 is a bottom plan view of the table. Fig. 10 shows detail views of the mechanism for elevating the lump from the mold. Fig. 11 is a detail section of the slide shown in Fig. 8.

In the said drawings the reference-numeral 1 designates the base of the machine, and 2 the frame thereof, consisting of two upwardly-extending standards or brackets, which support the working parts of the machine. Journaled in bearings 3, formed in the rear side of the said brackets, is a continuously-operating driving-shaft 4, provided with a loose pinion 5, located centrally between the brackets and which meshes with a cog-wheel 6, the shaft of which is journaled in half-boxes 7, formed integral with said brackets, and is held in place by bearings 8, hereinafter described.

The numeral 9 designates the table of the machine, located at the upper end of the brackets and which forms the bottom of the molds. This table is provided with a vertical wall 10, which forms the stationary back of the molds. Said brackets are formed with vertical extensions 12, formed with guide-grooves, in which work vertically-reciprocating slides 13, the lower ends of which are pivotally connected with pitmen 14, which in turn are secured pivotally to cranks 15 on the ends of the shaft 16 of the cog-wheel 6, so that as said shaft is rotated the said slides will be reciprocated or moved up and down. Guide-plates 17 hold these slides in place in the said extensions. Formed at the upper ends of said slides are lugs 18, through which extend set-screws 19, which engage blocks $19^a$, which are vertically adjustable. These blocks are formed with dovetailed slots 20, with which engage headed screws 21, connected with adjustable plungers 23, which screws are held in place by nuts 24. Screw-bolts 25 hold the said blocks in place on the set-screws.

Formed in the vertical wall 10 of the table are slots 26, and in the table itself are also formed slots 27, with which engage screws 28, which pass through holes in adjustable end plates 29. Screws $26^a$ also pass through brackets secured to the plates 29 and through the slots 26. By loosening these screws said plates may be laterally adjusted. These end plates are formed with rectangular openings, in which work the reciprocating end molds 30. These end molds are angular in form, and the horizontal portions are formed with slots 31, with which engage set-screws 32 for holding them in place. These end molds are connected with a slide, hereinafter described. The numeral 34 designates the front of the molds, consisting of an apron formed on its outer sides with guide-lugs 35, with which engages an arm 36, hinged at the lower end to a reciprocating plate 37, working in a bracket 38, secured to the said table. The upper end of this arm is formed with lugs 39, provided with a transverse pin $39^a$, which engages with a segmental slot in a curved lever 40. This lever is also formed with a slot 41, with which engages a pin 42, secured to lugs 43, integral with the plate 37. The lower end of said lever is pivotally connected with the bracket 38. This bracket is adjustably connected with the table by means of screws passing through slots therein, by loosening which the bracket may be adjusted. Located underneath of said table is a laterally-reciprocating slide 45, provided with a lug 46, with which the said plate 37 is connected, so as to travel therewith. This slide is formed with arms 47, formed with segmental slots 48, with which engage pins 49, secured to the end mold-plates and by which the latter are moved in and out as said slide is reciprocated. This slide is provided with an inwardly-extending arm 50, formed with lugs 52, with which engages an upwardly-extending arm 53, secured to a horizontally-reciprocating yoke 54, having lugs 56, which are journaled in guide-brackets 57, formed on the uprights or frame 2 of the machine. This yoke is formed with a way 58, with which engages a cam 59 on the shaft 16, so that as said shaft is rotated the yoke will be moved back and forth. Pivoted to said extending arm 53 is an arm 60, provided with a pivoted lug 61 at its free end, which is adapted to engage with the side of the bracket 2 and be thrown upward and elevate a pin 62, which projects through the table of the machine and serves to raise the compressed lump or plug, so that it can be grasped by the hand and be removed from the mold. A pin 63 on the arm 60 serves to limit the movement of the lug 61. This lug is formed with a slot 64, in which the lower end of the pin 62 falls after having been elevated to raise the compressed plug or lump.

There are two molds, one at each end of the machine, so that the description above given will relate to both, as they are identical in construction, and they are adapted to operate alternately—that is to say, as one opens the other is closed. To accomplish this, the pinion 5 is provided at opposite sides with clutch members 65, with which are adapted to engage slidable clutch members 67, formed with peripheral grooves 68. These slidable clutch members are carried by and laterally movable on the said shaft 4, but rotate therewith. Engaging with these grooves are lugs 69, carried on the ends of levers 70, which are pivoted to brackets formed integral with the base 1. Connected with these levers are links 71, which in turn are connected with pivoted treadles 72, by depressing which the said slidable clutch members of the pinion 6 and the molds can be operated to compress the lump or plug. A beveled lug 73 is formed on each of the levers 70, which is adapted to be struck by lugs 74 on opposite faces of the wheel 6, by which the sliding clutch members are thrown out of engagement with the clutch members of the pinion. These lugs 74 are also adapted to engage with pivoted arms 75, whereby backward movement of the parts is prevented.

Passing through brackets 76, formed on the inner sides of the uprights 2, are set-screws 78, the lower ends of which bear against the bearings 8, and thus serve to relieve the machine of the strain caused by compressing the plug or lump.

The operation is as follows: The molds are operated alternately—that is to say, as one is filled with tobacco to be compressed to form the lump or plug the other is opened to remove the compressed lump and receive a fresh supply of tobacco. Assuming that the mold at the right of the machine has been supplied with the requisite amount of tobacco, as the driving-shaft is rotated the workman depresses the treadle at this side of the machine, which will throw the slidable clutch member into engagement with the clutch member of the pinion, and thus cause the cog-wheel 6 to be rotated. The cam or crank on this end of the shaft will now force the yoke 54 backwardly, which in turn will operate the slide 45, so as to operate the end plates of the mold and also the hinged apron and the vertically-movable plunger, which compresses the lump or plug. After such compression the movements are reversed and the next mold brought into operation. As the lumps are thus compressed the pivoted arm 60 and lug 61 are operated so as to elevate the pin 62, which will raise the lump or plug from the bottom of the mold and enable it to be readily grasped and removed.

The reciprocating plates 37 at the front ends are formed with lugs 79, through which pass screws 80, by which said plates are adjustably connected with the slides 45.

Having thus fully described my invention, what I claim is—

1. In a tobacco-press of the character described, the combination with the molds at opposite ends of the same, provided with stationary bottoms and backs, of the fronts or aprons, the reciprocating slides, the arms hinged to the inner ends thereof carrying the said aprons, the guides in which said slides work, the slotted levers to which said arms are pivoted and which are pivoted to said guides, and means for operating said slides and hinged arms, substantially as described.

2. In a tobacco-press of the character described, the combination with the molds comprising the stationary bottoms, and backs, the stationary end plates, the movable end molds, and the aprons, of the slotted arms, the reciprocating slides, the arms pivoted to the inner ends thereof and connected with the aprons, the lugs formed integral with said slides, the slotted levers pivoted to said arms, the pins secured to said lugs engaging with the slots in said levers, the brackets to which said slides are connected and to which said levers are pivoted, the horizontally-movable slides formed with segmental slots, the pins on the said end molds engaging therewith and which slide is also connected with the slides carrying the aprons, the arms and the yokes engaging therewith and means for operating the same, substantially as specified.

3. In a tobacco-press of the character described, the combination with the frame, the rotatable driving-shaft, the loose pinion carried thereby formed with clutch members, the slidable clutch members on said shaft adapted to engage therewith, the levers and the treadles connected with said slidable clutch members, of the cog-wheel meshing with said pinion, its shaft, the cams on said shaft, the yokes operated thereby, the molds and connections between the same and the yokes whereby the molds are operated, substantially as specified.

4. In a tobacco-press of the character described, the combination with the frame, the rotatable driving-shaft provided with a loose pinion formed with clutch members, the slidable clutch members carried by said shaft and adapted to engage therewith, and the treadles connected with said slidable clutch members, of the cog-wheel with which said pinion meshes, the cranks at the ends thereof, the pitmen connected therewith, the vertically-movable plungers, and the molds, substantially as specified.

5. In a tobacco-press of the character described, the combination with the vertically-reciprocating plungers, of the molds comprising the stationary bottoms and backs and the adjustable end plates formed with holes or openings and the reciprocating molds passing therethrough, of the horizontally-reciprocating slides, the arms pivoted thereto, the fronts or aprons connected with said arms, the slotted levers pivoted to said slides with which said arms are connected, the brackets to which said levers are pivotally connected, and means for operating said slides and reciprocating end plates, substantially as specified.

6. In a tobacco-press, the combination with the frame, the rotatable driving-shaft, the loose pinion thereon formed with clutch members, the slidable clutch members carried by said shaft, the treadles and connections, of the cog-wheel with which said pinion meshes, the shaft thereof, provided with end cams or cranks, the pitmen connected therewith, the vertically - reciprocating plungers carried thereby, the horizontally-movable yokes operated by said cranks or cams, the heads carried thereby, the horizontally-movable slides connected therewith formed with segmental slots, the end plates connected therewith, the slides connected with said yokes, the pivoted bars connected therewith, the aprons and the slotted levers, substantially as described.

7. The combination with the frame, the rotatable driving-shaft, the loose pinion connected therewith formed with opposite clutch members and the slidable clutch members formed with peripheral grooves, the levers engaging therewith provided with lugs, the pitmen pivotally connected with said levers, and the treadles, of the cog-wheel meshing with said pinion and provided with lugs adapted to engage with the lugs on said levers, substantially as described.

8. In a tobacco-press, the combination with the frame, and the molds, of the horizontally-movable yoke and means for operating the same, the heads secured thereto, the arms pivoted to said heads and provided with pins, the lugs pivoted to the free ends of said levers and the pins supported by said lugs and passing through the bottoms of the molds, substantially as described.

In testimony whereof I have hereunto set my hand in presence of two subscribing witnesses.

JOHN H. KESTER.

Witnesses:
EMMA M. GILLETT,
BENNETT S. JONES.